United States Patent
Hagvall et al.

(10) Patent No.: US 12,515,649 B2
(45) Date of Patent: Jan. 6, 2026

(54) AUTONOMOUS VEHICLE AND METHOD FOR OPERATING AN AUTONOMOUS VEHICLE

(71) Applicant: Volvo Autonomous Solutions AB, Gothenburg (SE)

(72) Inventors: Linus Hagvall, Gothenburg (SE); Fredrik Sandblom, Mölndal (SE)

(73) Assignee: Volvo Autonomous Solutions AB, Gothenburg (SE)

( * ) Notice: Subject to any disclaimer, the term of this patent is extended or adjusted under 35 U.S.C. 154(b) by 102 days.

(21) Appl. No.: 18/546,527

(22) PCT Filed: Dec. 3, 2021

(86) PCT No.: PCT/EP2021/084182
§ 371 (c)(1),
(2) Date: Aug. 15, 2023

(87) PCT Pub. No.: WO2022/179734
PCT Pub. Date: Sep. 1, 2022

(65) Prior Publication Data
US 2024/0001916 A1    Jan. 4, 2024

(30) Foreign Application Priority Data
Feb. 23, 2021   (EP) .................... 21158796

(51) Int. Cl.
*B60W 30/095*     (2012.01)
*B60W 60/00*     (2020.01)

(52) U.S. Cl.
CPC .... B60W 30/0953 (2013.01); B60W 60/0016 (2020.02); B60W 60/00186 (2020.02); *B60W 2520/10* (2013.01); *B60W 2554/4041* (2020.02)

(58) Field of Classification Search
CPC ......... B60W 30/0953; B60W 60/0016; B60W 60/00186; B60W 2520/10;
(Continued)

(56) References Cited

U.S. PATENT DOCUMENTS

2014/0236477 A1   8/2014  Chen et al.
2018/0004215 A1   1/2018  Miller et al.
(Continued)

FOREIGN PATENT DOCUMENTS

WO   2016100796 A1   6/2016

OTHER PUBLICATIONS

International Search Report and Written Opinion of the International Searching Authority in corresponding International Application No. PCT/EP2021/084182 mailed May 19, 2022 (15 pages).
(Continued)

*Primary Examiner* — Dylan M Katz
(74) *Attorney, Agent, or Firm* — Venable LLP; Jeffri A. Kaminski (57) ABSTRACT

A method of controlling an autonomous vehicle, AV, which is navigable in an environment with at least one prohibited area and at least one calibration station. The AV comprises a state estimation system configured to output an estimated state including an estimated position of the AV, wherein the estimated state has a guaranteed accuracy while the AV is visiting the calibration station. According to an embodiment, the method comprises an assessment, on the basis of the AV's estimated state and the time elapsed since the AV's latest visit at one of the calibration stations, whether the AV is staying outside the prohibited area with a predetermined confidence level $\gamma$. If the assessment produces a negative result, a safety-oriented action is taken. The assessment may
(Continued)

include an evaluation whether the AV is staying outside the prohibited area by a margin which includes a position uncertainty.

18 Claims, 6 Drawing Sheets

(58) Field of Classification Search
CPC ..... B60W 2554/4041; B60W 50/0098; B60W 2050/0083; G01C 25/005
See application file for complete search history.

(56) References Cited

U.S. PATENT DOCUMENTS

| | | |
|---|---|---|
| 2018/0074201 A1 | 3/2018 | Sakai et al. |
| 2019/0204427 A1* | 7/2019 | Abari ................ G01S 17/86 |
| 2020/0239012 A1 | 7/2020 | Ying et al. |
| 2023/0286536 A1* | 9/2023 | Belman ............. G01C 21/3415 |

OTHER PUBLICATIONS

Written Opinion of the International Preliminary Examining Authority in corresponding International Application No. PCT/EP2021/084182 mailed Nov. 18, 2022 (10 pages).
International Preliminary Report on Patentability in corresponding International Application No. PCT/EP2021/084182 mailed Jun. 1, 2023 (10 pages).
Extended European Search Report in corresponding European Patent Application No. 21158796.9 dated Aug. 30, 2021 (9 pages).

* cited by examiner

AUTONOMOUS VEHICLE AND METHOD FOR OPERATING AN AUTONOMOUS VEHICLE

CROSS-REFERENCE TO RELATED APPLICATIONS

This application is a U.S. National Stage application of PCT/EP2021/084182, filed Dec. 3, 2021 and published on Sep. 1, 2022, as WO 2022/179734, which claims the benefit of European Patent Application No. 21158796.9, filed Feb. 23, 2021, all of which are hereby incorporated by reference in their entireties.

TECHNICAL FIELD

The present disclosure relates to the field of automated vehicular navigation and in particular to a safety system allowing an autonomous vehicle to be navigated for limited time with high integrity.

BACKGROUND

In the patent application published as US20200239012A1, an agricultural machine with an automatic operation mode is disclosed. In the automatic operation mode, the machine moves along a specified path across farmland while it is controlled in such manner as to stay outside obstacle areas where an operator has identified trees, larges stones etc. The agricultural machine has a positioning system comprising an inertial measurement unit (IMU) and a satellite positioning unit. When a control system determines that the agricultural machine is in an abnormal state, an emergency stop is triggered. Such abnormal state may include that the agricultural machine is straying from its specified path, or that a communication link of any component in the machine has been disconnected for more than 60 seconds.

It would not be advisable to apply the teachings of US20200239012A1 straightforwardly to autonomous vehicles that are to operate in populated environments, nor to utilize the obstacle areas for the protection of people or other vehicles. A possible though most likely very costly way to render the vehicle according to US20200239012A1 fit for missions with higher safety stakes would be to replace its positioning and control systems with high-integrity equipment and run validated software only.

US2018004215A1 discloses a method for controlling an autonomous vehicle to pick up a passenger at a requested pickup location. The vehicle is controlled based on data from an internal positioning system.

WO2016100796A1 discloses a method where an unmanned aerial system (UAS) is positioned relative to a flight boundary which delimits a prohibited flight area. If the UAS is found to be too close to the flight boundary, a flight limitation (e.g., 180° turn, parachuting) is triggered. The flight limitation may also be triggered in the event of a failure in a Global Positioning System (GPS) receiver in the UAS.

SUMMARY

One objective of the present disclosure is to make available a method and a system for controlling an autonomous vehicle (AV) which, up to a predetermined confidence level, shall stay outside a prohibited area. It is a further objective to propose such methods and systems that achieve this goal in a cost-efficient fashion, with particular attention to the expenditure on high-integrity equipment and software.

These and other objectives are achieved by the invention defined in the independent claims. The dependent claims relate to advantageous embodiments.

In a first aspect of the invention, there is provided a method of controlling an AV, which is navigable in an environment with at least one prohibited area and at least one calibration station. The AV comprises a state estimation system configured to output an estimated state including an estimated position of the AV, wherein the estimated state has a guaranteed accuracy while the AV is visiting the calibration station. According to an embodiment, the method comprises an assessment, on the basis of the AV's estimated state and on the basis of the time elapsed since the AV's latest visit at one of the calibration stations, whether the AV is staying outside the prohibited area with a predetermined confidence level $\gamma$. If the assessment produces a negative result, a safety-oriented action is taken.

The method according to the first aspect is able to ensure that the AV is staying outside the prohibited area with confidence level $\gamma$. On the one hand, the AV has access to at least one calibration station in the environment, which it can visit to calibrate its state with a guaranteed accuracy. On the other hand, the accuracy which the AV has acquired during a calibration event is purposefully discounted as a function of the time elapsed since that event. The combination of these technical features allows calibration data to be supplied to the AV without a significant risk that the AV overestimates the resulting accuracy and/or relies on outdated calibration data in its decision-making. None of the two proposed technical features is particularly cost-driving; rather, the method retains its high integrity even when implemented in a system that may contain non-specialized equipment or non-validated software to some extent.

In a second aspect of the invention, there is provided an AV which is navigable in an environment with at least one prohibited area and at least one calibration station. The AV comprises an autonomous driving system (ADS) configured to generate control signals, a state system configured to output an estimated state of the AV, and a safety system. The estimated state has a guaranteed accuracy while the AV is visiting the calibration station. The safety system is configured to assess, on the basis of the state estimated by the positioning system and the time elapsed since a latest visit at a calibration station, whether the AV is staying outside the prohibited area with a predetermined confidence level $\gamma$, and, in case of a negative result of the assessment, to cause the ADS to take a safety-oriented action.

In a third aspect, the invention further relates to a computer program containing instructions for causing a computer, or the AV or its safety system in particular, to carry out the above method. The computer program may be stored or distributed on a data carrier. As used herein, a "data carrier" may be a transitory data carrier, such as modulated electromagnetic or optical waves, or a non-transitory data carrier. Non-transitory data carriers include volatile and nonvolatile memories, such as permanent and non-permanent storage media of magnetic, optical or solid-state type. Still within the scope of "data carrier", such memories may be fixedly mounted or portable.

The second and third aspects generally share the advantages of the first aspect and they can, like the first aspect, be embodied in a multitude of ways.

In the present disclosure, the term "guaranteed accuracy" is used synonymous to verified accuracy, specified accuracy or similar expressions. The guaranteed accuracy may be quantified by means of empirical estimations, or it may be derivable from specifications for the hardware or software that are deployed in the calibration station and/or the AV. Different calibration stations in an environment may be associated with different values of the guaranteed accuracy. By contrast, when the AV leaves the calibration station and starts estimating its state independently, the accuracy of the estimation will gradually decrease unless corrective or calibrating action is taken. The guaranteed accuracy may be expressed as a confidence interval on the state (e.g., position deviation) with a confidence level $\gamma'$ that need not coincide with the confidence level $\gamma$. A guaranteed accuracy in this sense is entirely decoupled from the legal concept of a guarantee.

As used herein, a "confidence level $\gamma$" may be connected to the notion of a confidence interval, i.e., if the assessment was repeated, the fraction of outcomes where the vehicle stays outside the prohibited area would tend towards at least $\gamma$. Alternatively or additionally, a confidence level of $\gamma$ may refer to a probability distribution of the AV's location, to mean that the probability of the AV entering the prohibited area is at most 1-$\gamma$. Such a probability distribution may be only partially known or merely estimated. In safety-critical AV control systems, it is not uncommon to require $\gamma$=99% or higher. The acceptancy for critical errors is very low, and the confidence level may be set accordingly.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

Aspects and embodiments are now described, by way of example, with reference to the accompanying drawings, on which.

DETAILED DESCRIPTION

The aspects of the present disclosure will now be described more fully hereinafter with reference to the accompanying drawings, on which certain embodiments of the invention are shown. These aspects may, however, be embodied in many different forms and should not be construed as limiting; rather, these embodiments are provided by way of example so that this disclosure will be thorough and complete, and to fully convey the scope of all aspects of the invention to those skilled in the art. Like numbers refer to like elements throughout the description.

Figure 1:
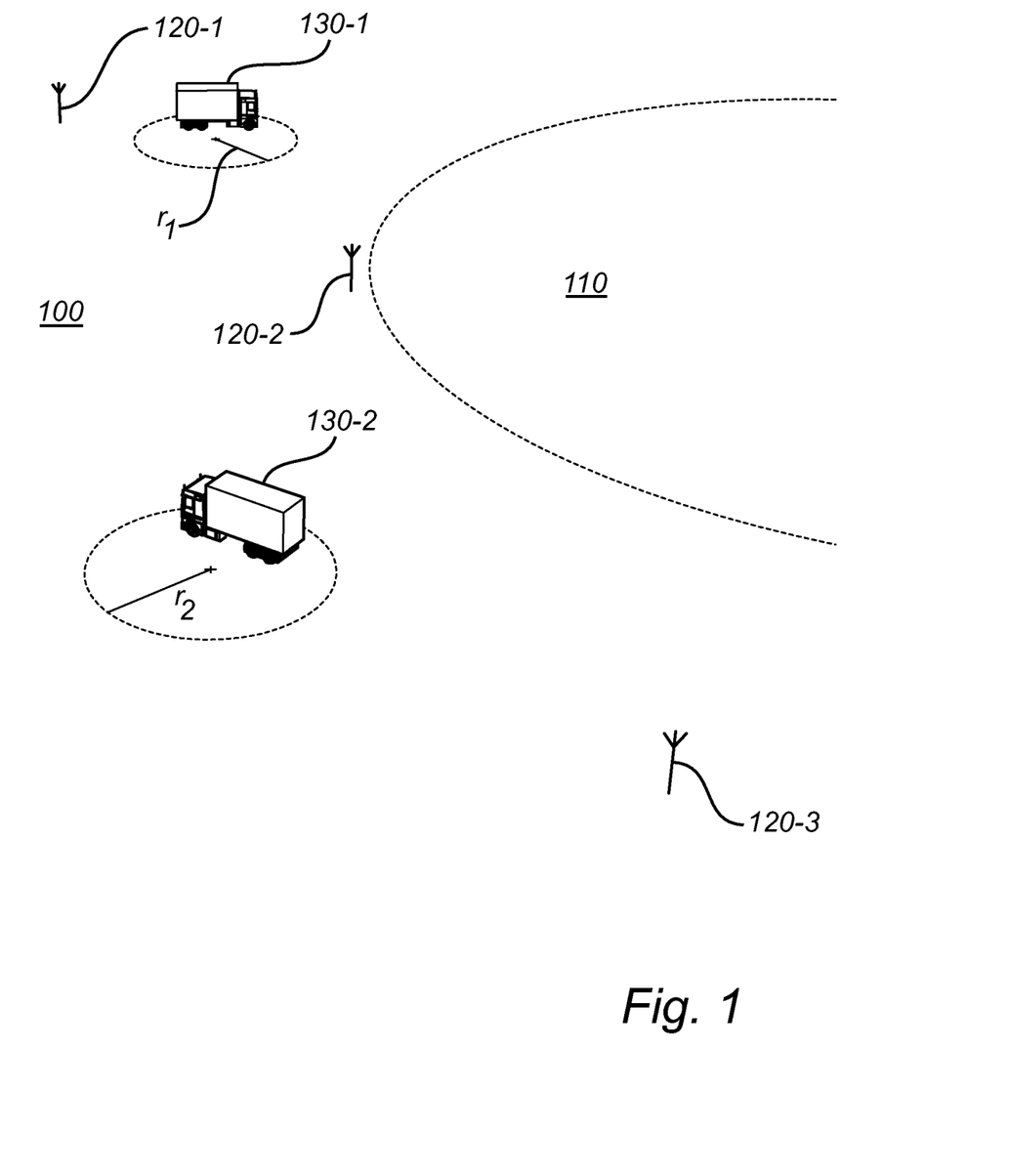
FIGS. 1, 2 and 3 show environments with respective prohibited areas and calibration stations, in which AVs navigate.

FIG. 1 shows an environment 100 in which AVs 130-1, 130-2 navigate. The environment 100 may for example be an outdoor rural or urban environment with a road network; land used for agriculture or forestry; an indoor environment, such as a warehouse; a mixed indoor-outdoor environment, such as a logistics terminal or port; a subterranean environment, such as a system of tunnels or a mine. FIG. 1 further shows a portion of a prohibited area 110, to be understood as a subset of the environment 100 which the AVs 130 shall be controlled not to enter, and three calibration stations 120-1, 120-2, 120-3. The prohibited area 110 may be non-moving or its location may change over time. It may be common to both AVs 130, as may be the case where a physical obstacle or a recurring presence of unprotected traffic participants motivates the prohibited area 110.

Alternatively, a set of prohibited areas is defined for each AV 130 independently. Then, if a zone around a first AV 130-1, or a zone around its planned trajectory, is included in the set of prohibited areas which is to apply in respect of a second AV 130-2, the second AV 130-2 will be controlled to avoid collisions with the first AV 130-1. It the AVs 130 move fast or often, it is advantageous to implement this collision avoidance approach in applications where the AVs 130 maintain fast and reliable wireless communication links to a traffic coordinating entity (e.g., fleet management system), so that the respective sets of prohibited areas 110 can be reconfigured frequently.

Figure 2:
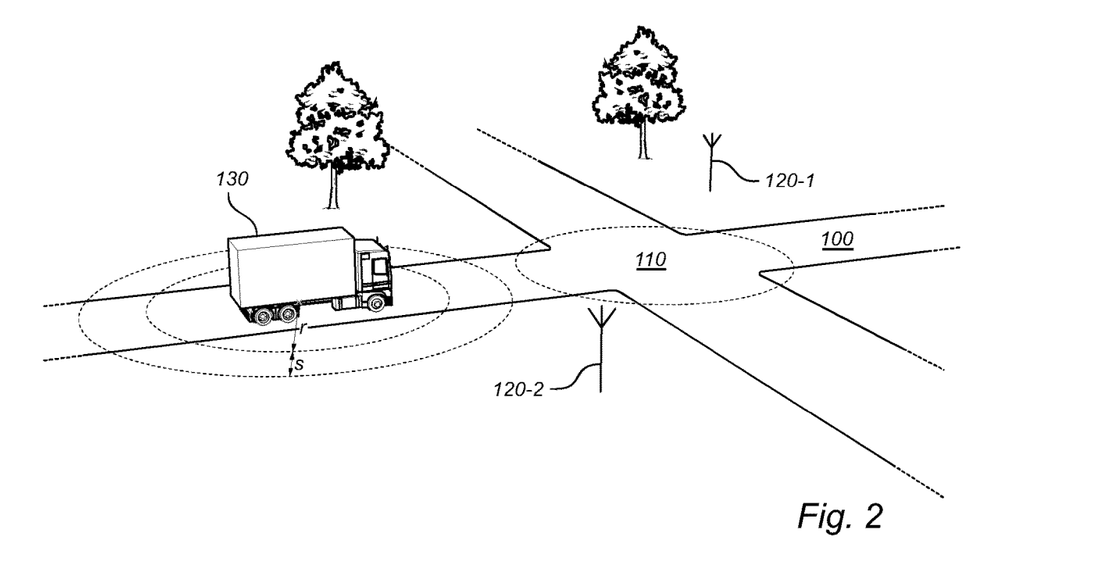

Further alternatively, prohibited areas are used to safely guide traffic past intersections, into loading zones or generally through road segments where vehicles cannot coexist, or where they can coexist only if their paths fulfil certain conditions. This is illustrated in FIG. 2, where a prohibited area 110 in the central part of a road intersection is defined by default for all AVs 130 moving in the environment 100. A scheduling strategy may be implemented in a traffic coordinating entity such that the default prohibited area 110 is undone in respect of an oncoming AV 130 and reinstated in respect of the same AV 130 when it has passed. Clearly, if the prohibited area 110 is occupied by another vehicle, the oncoming AV 130 may need to slow down and wait for its turn. If the traffic coordinating entity is aware of the planned paths of the vehicles moving in the environment 100, it may allow two AVs 130 driving parallel or in sequence to cross the intersection quasi-simultaneously, or it may allow AVs 130 with antiparallel paths to meet in the intersection if it is wide enough. These advantages are made possible by letting each AV 130 receive a vehicle-specific definition of the prohibited area(s) 110.

In a further development of this embodiment, the traffic coordinating entity may grant an AV 130 a temporary exception from the duty to observe a prohibited area 110, wherein an indication of the exception's duration may assist an autonomous driving system (ADS) in the AV 130 in estimating whether it will have enough time to pass before the exception expires.

It is furthermore envisioned to implement controlled sharing of a prohibited area 110 that represents an intersection or similar constrained road segment also in the absence of a central traffic coordinating entity. This may be achieved by means of electronic keys, blockchains or similar techniques allowing an AV 130 to request permission to use the prohibited area 110 and hand the permission back afterwards, in a manner traceable and/or inspectable by the other AVs 130, preferably in real time.

Figure 6:
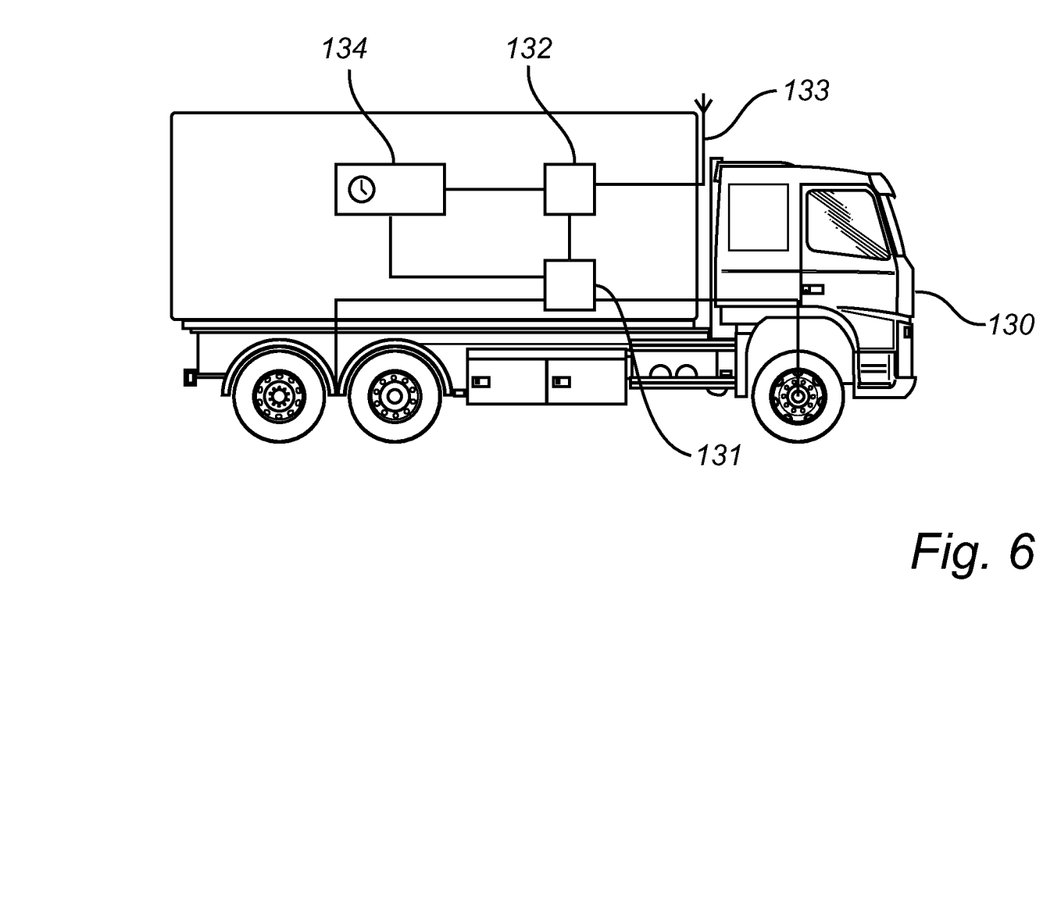
FIG. 6 shows an AV.

FIG. 6 shows an example AV 130 in greater detail. While the depicted AV 130 is a single-unit commercial truck, the use cases of the present invention include cars, buses, construction equipment and vehicle combinations. In addition to the regular structural and functional elements of a vehicle, the AV 130 comprises an autonomous driving system (ADS) 131, which is configured to generate control signals to the driveline, brakes, steering wheels etc. to fulfil a driving mission with account taken of the AV's 130 own position, other road users and further relevant conditions. A state system 132 in the AV 130 is configured to output an estimated state of the AV, wherein the estimated state has a guaranteed accuracy while the AV is visiting a calibration station 120. The state system 132 may be a multimodal sensing system. It may base its state estimation on indicators of the AV's 130 movements (e.g., an inertial measurement unit (IMU), a wheel rotary encoder, a wheel torque sensor), on absolute and relative positioning sources (e.g., an optical or electromagnetic receiver 133 for receiving satellite navigation signals, for imaging optical landmarks and/or communicating with radio-frequency (RF) beacons, access points or cellular base stations). It is to be expected that the AV 130 has access to all the positioning sources only in some locations or during certain periods of time. The AV 130 further comprises a safety system 134 to be described below. The state system 132 may further include a dead-reckoning arrangement, which may include an observer, such as a Kalman filter.

A calibration station 120 may be a device or arrangement configured to confirm a predefined position of an AV 130. A calibration station 120 may be adapted to serve a moving or stationary AV 130, or both. The confirmable predefined position may be referred to as a home position of the calibration station 130. Calibration stations 120 of this type may include fixed mechanical sensors (e.g., scales, weighbridges), buried inductive or capacitive sensors arranged to sense passing vehicles. Alternatively, a calibration station 120 may be configured to determine an actual position of a nearby AV 130 or to assist a nearby AV 130 which attempts to determine its own position. Calibration stations 120 of this second type may comprise active or passive optical fiducials (or landmarks), RF transponders (e.g., RFID tags), RF transmitters for providing precisely timed time reference signals, RF transceivers configured for measurements of round-trip time. To interact with such calibration stations 120, the AV 130 may use an optical sensor 133 (FIG. 6) to image an optical landmark, or a receiver 133 to receive an electromagnetic or optical signal. A calibration station 120 may furthermore confirm, determine or assist in determining other state variables of an AV 120, such as a heading (yaw orientation), velocity or acceleration. These kinematic quantities may be sensed in a per se known manner by combinations of fixed sensors, such as buried road sensors configured to determine successive times of passage. To the extent the calibration station 120 communicates with the AV 130, this may proceed directly via a local communication link or via a network covering the environment 100 and optionally via a central server or host computer. It is common to these examples that the AV 130 benefits from the accuracy provided by the calibration station 120 for at most as long as the AV 130 visits it, e.g., by being relatively nearby or within a line-of-sight.

Since each added calibration station 120 incurs a cost for installation and maintenance, it is a relevant question how a given number of calibration stations 120 are best placed to support smooth operation of the AVs 130 (e.g., maximize joint performance of the AVs 130, or maximize the total useful traffic flow) while maintaining the desired high integrity of the system. The placement of the calibration stations 120 in an environment 100 may follow one or more heuristics. One embodiment includes a heuristic that the calibration stations 120 are to be located close to the (non-moving) prohibited areas 110. If the prohibited areas 110 are defined on a vehicle-by-vehicle basis, the calibration stations 120 are preferably located close to those prohibited areas 110 that are common to all AVs 130 operating in the environment 100. With this placement, when an AV 130 approaches the prohibited area 110 along a path that includes a visit to a calibration station 120, the accuracy of the estimated state of the AV 130 improves; this way, the ensuing decrease in position uncertainty partially offsets the decrease in distance to the prohibited area 110, and driving may be disturbed to a lesser degree. In some embodiments, the term "close" may have a relative meaning and refer to the total extent of the environment 100, e.g., a calibration station 120 may be separated from the prohibited area 110 by at most 1% of a diameter of the environment 100. In other embodiments, "close" may be an absolute distance, such as the distance covered in a predefined time at normal operating speed, e.g., 15 seconds, 30 seconds, 60 seconds, or another time that allows the AV 130 sufficient time to visit the calibration station 120, assess whether the AV 130 is staying outside the prohibited area 110 and take a safety-oriented action if needed.

A second possible heuristic is to arrange calibration stations 120 in areas of the environment 100 where a single AV 130 would operate at relatively high speed. As used herein, "relatively high speed" may correspond to full operating speed of the AV 130 or to a maximum permitted speed in the environment 100. One effect to be expected from such placement is that the relatively greater braking distance which applies at high vehicle speed is offset by the availability or relatively more recent calibration data, i.e., the state system's 132 estimated vehicle state has not had time to drop substantially below the guaranteed accuracy. This placement provides a similar benefit in connection with two-way streets, where AVs 130 may be expected to meet frequently at relatively small lateral separation. If each or both oncoming AVs' 130 estimated states have been calibrated recently, then the assessment may have a positive outcome (no safety-oriented action needed) despite the small lateral separation at the meeting point without a need to slow down the oncoming AVs 130.

The calibration station(s) 120 typically occupy a minor fraction of the environment 100. For example, the calibration station(s) 120 may correspond to less than 10% of the area of the environment 100, such as less than 1% of the area of the environment 100, less than 0.1% of the area of the environment 100. Accordingly, access to accurate position estimation that an AV 130 moving in the environment 110 will experience is deterministic but intermittent. As is clear from the above examples, the term "calibration station" in the present disclosure primarily refers to a device, an arrangement, installation or artefact. The term normally does not refer to the absence of certain artefacts: an unobscured area where the natural conditions for radio communication and/or satellite navigation are good is not a "calibration station" in this sense.

Away from a calibration station 120, state system 132 of the AV 130 is left to keep track of its position by dead reckoning on the basis of IMU data, encoder signals, sensor signals or the like. The AV 130 may furthermore perform localization with respect to a predefined map of the environment 100 on the basis of data from an onboard lidar or optical sensor. As long as the AV 130 keeps track of its position in these or similar ways without visiting a calibration station 120, the accuracy of the state system's 132 estimated state will decrease gradually. Theoretically, there are many factors that may influence the rate of this accuracy decrease, including the AV's 130 average speed, the number of stops, the occurrence of strong acceleration or deceleration or sharp turning maneuvers, as well as meteorological and visibility conditions. The inventors have realized, however, that the time elapsed since the latest visit at a calibration station 120 is a key factor, which may be sufficient on its own to judge the accuracy of the state system's 132 estimated state. This realization distinguishes the invention from such prior art emergency techniques that have been conceived for handling sudden (or seemingly random) positioning outages, such as GPS failures.

It is pointed out for completeness that, in some embodiments of the invention, the time elapsed since a latest visit at one of the calibration stations 120 may be used in combination with other criteria. For example, the fact that the AV 130 receives calibration or correction data without visiting one of the calibration stations 120 may override the time-based criterion or trigger an exception. The effect of such an exception may be that the accuracy of the state system's 132 estimated state is increased by an amount reflecting the improvement to be expected from the calibration or correction data.

The safety system 134 is configured to ensure that the AV 130 stays outside the prohibited area 110 with a predetermined confidence level $\gamma$. The confidence level $\gamma$ may be pre-programmed by a manufacturer of the AV 130 or stipulated by a road authority in charge of the safety in the environment 100. The safety system 134 receives the state estimated by the positioning system 132 and reads the time elapsed since a latest visit at a calibration station 120. On the basis of this information and the definition of the prohibited area 110, the safety system 134 may estimate the total probability that the AV 130 enters the prohibited area 110. For this purpose, the safety system 134 may integrate an estimated probability density function over the prohibited area 110. The estimation of the probability may refer to a current time or to a forward interval beginning at the current time, such as the next seconds, next tens of seconds, next minute or couple of minutes. The safety system 134 then assesses whether the estimated total probability is less than $1-\gamma$, in which case normal operation is continued; if the estimated total probability that the AV 130 enters the prohibited area 110 is greater than $1-\gamma$, a safety-oriented action is taken. The safety-oriented action may include halting the AV 130 (emergency stop), limiting the AV's 130 speed, or initiating a lateral or longitudinal avoidance maneuver. It is recalled that the probability $1-\gamma$ may in practice be a fairly small value; accordingly, the safety-oriented action can be more correctly characterized as an early corrective measure, such as a gentle deflection of the AV's 130 movement, to keep it from approaching the prohibited area further, or a slowdown.

Alternatively, the safety system 134 attempts to position the vehicle with confidence level $\gamma$ on the basis of this information. If no such positioning is possible with the desired confidence level or the positioning returns a position in the prohibited area 110, the safety-oriented action is taken. One reason why a positioning with the desired confidence level is impossible could be that the accuracy of the state estimated by the positioning system 132 may have decreased too much from the guaranteed accuracy, which is the accuracy it had during the latest visit at one of the calibration stations 120. Further alternatively, the safety system 134 may cause the state system 132 to estimate the vehicle's state with a granularity that grows with time, e.g., estimate the position with reference to a spatial grid with increasing cell size.

Figure 3:
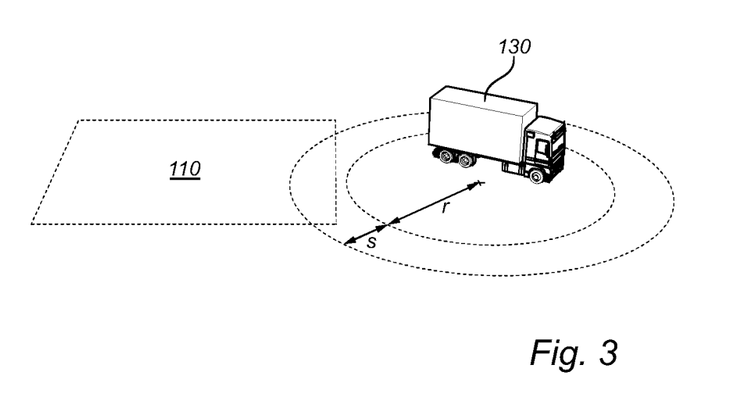

Alternatively or additionally, the approach illustrated in FIGS. 1 to 3 is followed. Here, the estimated position of each AV 130 is illustrated by a x symbol at the ground projection of an imaginary reference point on the AV 130. These figures furthermore indicate respective position uncertainties in terms of radii $r$, $r_1$, $r_2$, of disc-shaped confidence intervals for the position, wherein the confidence intervals have a confidence level $\gamma$. As mentioned, each of these confidence intervals may be understood as a region of the environment 100 which during repeated sampling would contain the position of the AV 130 in all but a fraction $1-\gamma$ of the repetitions. In other words, the estimated position of the AV 130 is modified with a position uncertainty, and the position uncertainty is related to the confidence level $\gamma$. As seen in FIG. 1, the uncertainty radius $r_1$ of the first AV 130-1, which has recently left the first calibration station 120-1, is somewhat smaller than the uncertainty radius $r_2$ of the second AV 130-2 which has been moving for a longer while since its visit at the third calibration station 120-3.

With access to a $\gamma$-level confidence interval for the position, the assessment whether the AV is staying outside the prohibited area 110 with a predetermined confidence level $\gamma$ can take the form of an evaluation whether any portion of the confidence interval overlaps with the prohibited area 110. This is not the case for any of the AVs 130 in FIGS. 1-3.

The precise statistical modeling of the position uncertainty is not an essential feature of the invention, particularly as different assumptions can be made about the probability distribution of the AV's 130 position in different use cases. Likewise, different theoretical results can be relied upon to approximate the infinitesimal and/or asymptotic growth with time of the radius of the confidence interval. In some embodiments, it is assumed that the radius $r$ of a circular position confidence interval grows as a $p^{th}$ power of time $t$, that is, $r(t) \propto t^p$ for small $t$, where $0 < p < 1$. In some embodiments, it is assumed that $$\frac{1}{4} < p < \frac{3}{4}$$

or that $$p \approx \frac{1}{2}.$$

It is emphasized in this connection that the time-dependent radius represents a bound on the growth of the localization uncertainty, which is not necessarily a bound on the absolute error.

In some embodiments, the position uncertainty relates not only to the position of the AV 130 but also to the heading (yaw angle), speed and/or acceleration. The time evolution of these quantities may be modeled in a similar or different fashion as the position itself. The availability of the AV's 130 velocity (i.e., heading and speed) makes it possible to determine a $\gamma$-level confidence interval for the position in a manner that reflects the non-isotropic nature of the AV's 130 imminent movements. One possible outcome may be that the greater part of such a confidence interval may be located ahead of the vehicle 130, in the direction it is moving. Forming confidence intervals of this type allows the safety system 134 to distinguish between the (probably unsafe) case where the AV 130 is located close to the boundary of a prohibited area 110 and driving towards it, and the case (probably safe for the time being) where the AV 130 is equally close but headed away from the prohibited area 110 or driving along its boundary. An illustration of these contrasting cases is found in FIGS. 2 and 3.

In further embodiments, where the safety-oriented action may be an avoidance maneuver, the assessment whether the AV is staying outside the prohibited area with a predetermined confidence level γ takes the effect of this potential avoidance maneuver into account. Avoidance maneuvers may be controlled or uncontrolled. An example uncontrolled avoidance maneuver is where the brakes are applied until the AV 130 comes to a full stop; a controlled avoidance maneuver usually includes a continuing ability to monitor and adjust the vehicle's trajectory during the maneuver. Avoidance maneuvers may furthermore be categorized as lateral or longitudinal, and combinations of these are possible.

A longitudinal avoidance maneuver may include one or more decelerating actions, such as inactivating a driving torque, activating a service brake or a parking brake, applying engine braking or regenerative braking etc. The braking distance (or stopping distance) depends on the current speed of the AV 130, and may be influenced by further factors such as road conditions, road inclination etc. As mentioned, the speed can be included in the (higher-dimensional) position uncertainty, in which case a brake distance s can be estimated with confidence level γ. In a simpler embodiment, the safety system 134 may add a constant worst-case braking distance $s=s_0$ corresponding to maximum speed of the AV 130. This is illustrated in FIGS. 2 and 3, where the braking distance s is added to a position uncertainty r related to the age of the latest visit to a calibration station 120. The outcome is positive (no safety-oriented action needed) in FIG. 2, wherein the prohibited area 110 is sufficiently far ahead of the AV 130, and negative in FIG. 3. In both FIGS. 2 and 3, the confidence interval is isotropic. If the heading of the AV 130 in FIG. 3 had been taken into account when the confidence interval was formed, the safety system 134 might have been able to conclude that the depicted driving situation was safe too (assuming the AV 130 is moving forward at some non-zero speed like FIG. 3 suggests).

Figure 4:
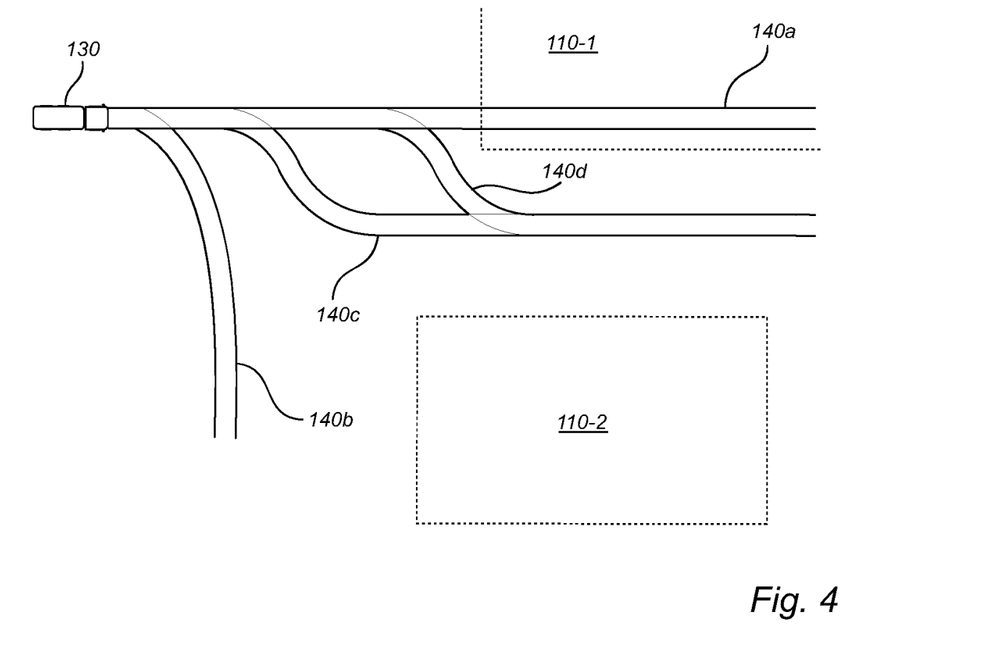
FIG. 4 illustrates lateral avoidance maneuvers of an AV.

A lateral avoidance maneuver includes a change of steering angle and/or of relative wheel speeds so as to deflect the AV 130 from an unsafe path that leads towards and potentially into a prohibited area 110. The lateral avoidance maneuver may optionally include a decelerating action, e.g., to prepare a turn, to brake during a turn (if this is possible within the friction budget) or to bring the vehicle to a halt after the completed maneuver to allow time to replan the AV's 130 path. FIG. 4 illustrates three possible avoidance maneuvers 140b, 140c, 140d off a planned path 140a of an AV 130 which moves in an environment with two prohibited areas 110-1, 110-2. It is assumed that a safety system 134 analyzes the availability of lateral avoidance maneuvers when the AV 130 is positioned as drawn. The first maneuver 140b must be initiated at an early stage but is then again relatively simple since it is not bothered by the second prohibited area 110-2, and the ADS 131 of the AV 130 therefore has a high likelihood of successfully completing it. The second maneuver 140c includes two turns and is therefore more complex, particularly as the second turn is crucial to avoid the second prohibited area 110-2. The third maneuver 140d is of equal complexity as the second maneuver 140c but may be considered safer since the AV 130 has more time to slow down to prepare the turns. The third maneuver 140d is however less preferable than the first and second ones 140b, 140c since no fallback maneuvers are available if the ADS 131 misses its opportunity to deflect the AV 130 just before the first prohibited area 110-1. Which of the three possible lateral avoidance maneuvers 140b, 140c, 140d the safety system 134 selects may depend on the value of the predefined confidence level γ. A higher confidence level γ may correspond to an earlier branching-off from the planned path 140a, since this leaves the safety system 134 with more fallback options.

Figure 5:
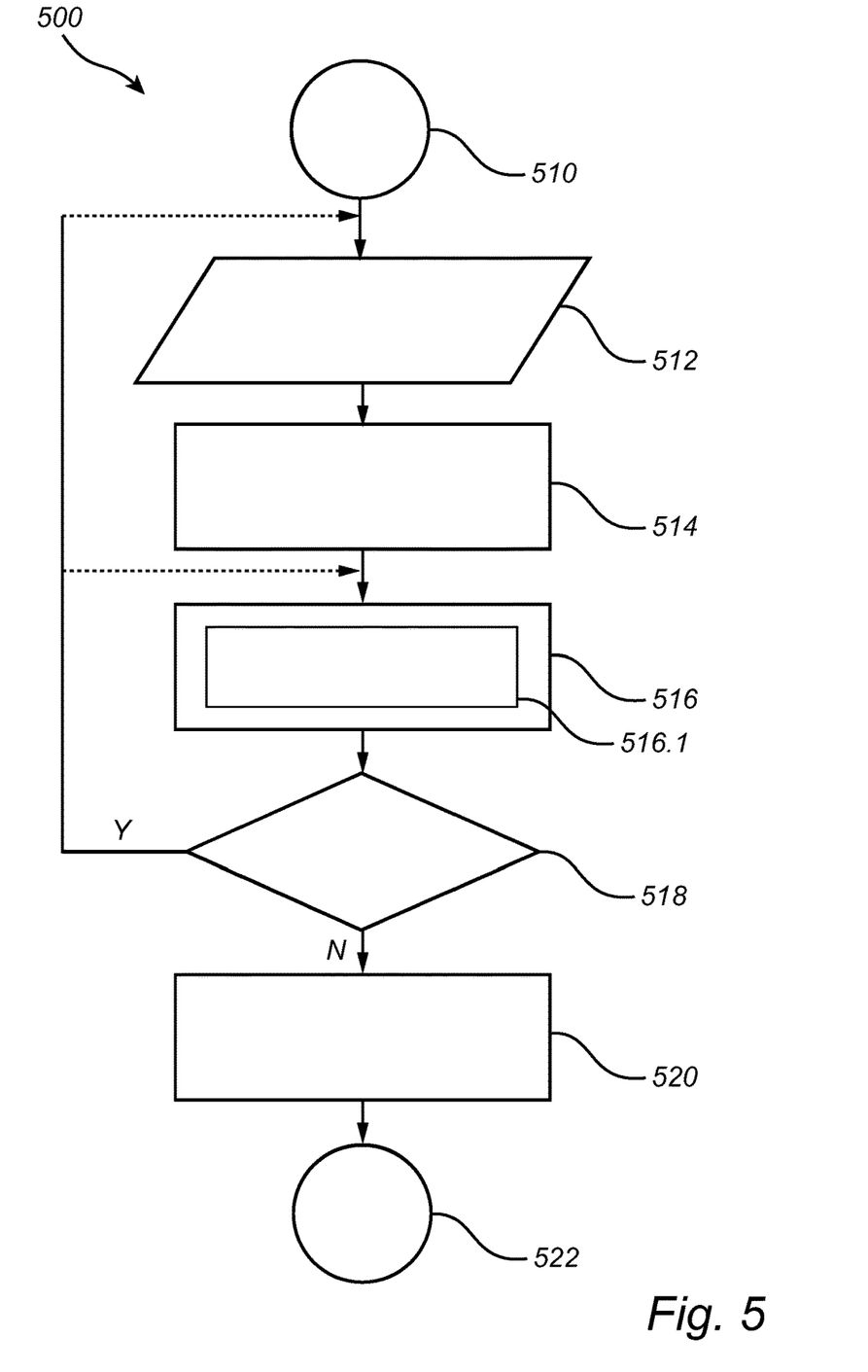
FIG. 5 is a flowchart of a method according to an embodiment.

FIG. 5 summarizes as a flowchart a method 500 of controlling an AV 130 which is navigable in an environment 100 with at least one prohibited area 110 and at least one calibration station 120. It is understood that the AV 130 comprises a state estimation system 132 configured to output an estimated state of the AV 130 (ego state) including an estimated position of the AV 130. The method 500 may be implemented in an AV 130, with all or most of its actions performed by a safety system 134 therein. Alternatively, the safety system 134 in charge of the AV's 130 safety is not an onboard system but uses at least one networked (or cloud) resource.

The method begins at point 510. In a first step 512, the AV 130 visits a calibration station 120, whereby the accuracy of the state estimated by the state system 132 rises to the guaranteed accuracy associated with the calibration station 120.

When the AV 130 leaves the calibration station 120, in a second step 514, it resets an internal clock, which thereby measures the time elapsed since the latest visit at one of the calibration stations in the environment 100. Equivalent to the clock, the AV 130 may use a variable whose value is incremented in a way that represents the growth of the absolute error with time, starting from the guaranteed accuracy.

In a third step 516, the AV 130 reads the clock and estimates its current state, including its current position. Optionally, in a substep 516.1, the AV 130 may receive a vehicle-specific definition of the prohibited area 110. Information representing this definition may be transmitted wirelessly by a traffic coordination entity which, as discussed above, may do so for the purpose of safely guiding AVs 130 through intersections, along road segments without meeting zones or other areas of the environment 100 where an increased collision risk exists.

In a fourth step 518 of the method 500, the AV 130 assesses whether it is staying outside the prohibited area with a predetermined confidence level γ. The assessment may be based on the output of step 516, that is, the AV's 130 estimated state and the time elapsed since a latest visit at one of the calibration stations 120. If the outcome of the assessment is positive (Y branch from step 518), the execution of the method loops back to the beginning, with a further visit 512 to a calibration station 120. Alternatively, the execution loops back to the third step 516. If the outcome is negative (N branch from step 518), a safety-oriented action is taken in step 520. The safety-oriented action may include safety system 134 sending a command to the ADS 131 of the AV 130 to initiate braking, an avoidance maneuver or the like. If a high confidence level value γ is used, rather little will be needed to trigger the safety-oriented action, and in this case it may suffice to adjust the AV's 130 bearing slightly so that it steers clear of the prohibited area.

Depending on the nature of the safety-oriented action, the method 500 may end in point 522 as illustrated, or the execution may be resumed from an earlier point of the flowchart.

The aspects of the present disclosure have mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method of controlling an autonomous vehicle ("AV") which is navigable in an environment with at least one prohibited area, which the AV shall be controlled not to enter, and
at least one calibration station, wherein the AV comprises a state estimation system configured to output an estimated position of the AV, wherein each calibration station is configured to determine a position of a nearby AV or assist a nearby AV which attempts to determine its own position, such that the estimated position of the AV's state estimation system has a guaranteed accuracy while the AV is visiting the calibration station, the method comprising:
on the basis of the AV's estimated position and time elapsed since a latest visit at one of the calibration stations, assessing whether the AV is staying outside the prohibited area with a predetermined confidence level $\gamma$, wherein the assessment includes modifying the estimated position with a position uncertainty which grows with said elapsed time; and
in case of a negative result of the assessment, taking a safety-oriented action including one or more of halting the AV, limiting the AV's speed and/or initiating an avoidance maneuver.

2. The method of claim 1, wherein the assessment includes forming a confidence interval for the position, such that the confidence interval's center corresponds to the estimated position and its size corresponds to the position uncertainty, and assessing whether any portion of the confidence interval overlaps with the prohibited area.

3. The method of claim 1, wherein the assessment is based on a current speed of the AV and includes considering the effect of a potential longitudinal avoidance maneuver, including one or more decelerating actions, as said safety-oriented action.

4. The method of claim 3, wherein the assessment includes an evaluation whether the AV is staying outside the prohibited area by a margin including a position uncertainty and a speed-dependent braking distance.

5. The method of claim 1, wherein the position uncertainty grows with a $p^{th}$ power of the time elapsed, wherein $0<p<1$.

6. The method of claim 2, wherein the position uncertainty is related to the confidence level $\gamma$.

7. The method of claim 1, wherein the assessment includes considering the effect of a potential lateral avoidance maneuver as said safety-oriented action.

8. The method of claim 7, wherein the lateral avoidance maneuver is suitable to deflect the AV from a path towards the prohibited area.

9. The method of claim 1, further comprising:
receiving a vehicle-specific definition of the prohibited area.

10. The method of claim 1, wherein the estimated position has the guaranteed accuracy for at most as long as the AV is visiting the calibration station.

11. The method of claim 1, further comprising receiving an indication of the confidence level $\gamma$ prior to said assessing.

12. The method of claim 1, wherein the safety-oriented action is suitable to keep the AV from approaching the prohibited area.

13. An autonomous vehicle ("AV") which is navigable in an environment with at least one prohibited area, which the AV shall be controlled not to enter, and
at least one calibration station, wherein the AV comprises:
an autonomous driving system, ADS, configured to generate control signals;
a state estimation system configured to output an estimated position of the AV, wherein the AV is configured to have its position determined by a nearby calibration station or be assisted by a nearby calibration station while it attempts to determine its own position, such that the state estimation system's estimated position of the AV has a guaranteed accuracy while the AV is visiting the calibration station; and
a safety system configured to:
on the basis of the position estimated by the state estimation system and the time elapsed since a latest visit at a calibration station, assess whether the AV is staying outside the prohibited area with a predetermined confidence level $\gamma$, wherein the assessment includes modifying the estimated position with a position uncertainty which grows with said elapsed time; and
in case of a negative result of the assessment, cause the ADS to take a safety-oriented action including one or more of halting the AV, limiting the AV's speed and/or initiating an avoidance maneuver.

14. The AV of claim 13, further comprising an optical sensor for imaging an optical landmark arranged at one of the calibration stations.

15. The AV of claim 13, wherein the state estimation system is configured for dead reckoning and/or map-based positioning based on an onboard sensor.

16. The AV of claim 13, wherein the positioning system is configured for dead reckoning and/or map-based positioning based on an onboard sensor.

17. A non-transitory computer readable medium storing instructions that when run on a computer, cause a vehicle to function as the AV of claim 13.

18. A system comprising calibration stations and a plurality of AVs according to claim 13, where the placement of calibration stations is optimized to improve a joint performance of the AVs or to maximize a total useful traffic flow.

* * * * *